United States Patent
Cowie et al.

(10) Patent No.: US 11,111,681 B2
(45) Date of Patent: Sep. 7, 2021

(54) POWER HEAD FOR POWERED CONCRETE ROLLER SCREED

(71) Applicant: Marshalltown Company, Marshalltown, IA (US)

(72) Inventors: Charles H. Cowie, Fayetteville, AR (US); Michael Shane Grigg, Springdale, AR (US)

(73) Assignee: Marshalltown Company, Marshalltown, IA (US)

( * ) Notice: Subject to any disclaimer, the term of this patent is extended or adjusted under 35 U.S.C. 154(b) by 0 days.

(21) Appl. No.: 16/577,468

(22) Filed: Sep. 20, 2019

(65) Prior Publication Data

US 2020/0190834 A1    Jun. 18, 2020

Related U.S. Application Data

(60) Provisional application No. 62/778,793, filed on Dec. 12, 2018.

(51) Int. Cl.
| | |
|---|---|
| *E01C 19/00* | (2006.01) |
| *E04G 21/10* | (2006.01) |
| *E01C 19/24* | (2006.01) |
| *E01C 19/29* | (2006.01) |

(52) U.S. Cl.
CPC ............. *E04G 21/10* (2013.01); *E01C 19/24* (2013.01); *E01C 19/29* (2013.01)

(58) Field of Classification Search
CPC ................................ E04G 21/10; E01C 19/24
USPC .......................................................... 404/103
See application file for complete search history.

(56) References Cited

U.S. PATENT DOCUMENTS

| 10,837,147 B2* | 11/2020 | Pyle | E01C 19/201 |
| 2014/0286707 A1* | 9/2014 | Churchill | E01C 19/29 |
| | | | 404/119 |
| 2020/0071891 A1* | 3/2020 | Pyle | E01C 19/262 |

* cited by examiner

*Primary Examiner* — Raymond W Addie
(74) *Attorney, Agent, or Firm* — Jason H. Conway

(57) ABSTRACT

A power head for a powered concrete roller screed includes a handle and a driver housing at a distal end of the handle. A cordless, battery-operated driver is received in the driver housing. A head actuator includes a translatable link extending along the handle and an eccentric cam. The eccentric cam is operatively connected to the translatable link within the drive housing such that translation of the translation link imparts rotation of the eccentric cam about a rotational axis of the eccentric cam to an actuated position. The eccentric cam is adjacent a trigger of a cordless, battery-operated driver and is configured to depress the trigger when the eccentric cam is rotated about its rotational axis to the actuated position.

16 Claims, 8 Drawing Sheets

FIG. 5

POWER HEAD FOR POWERED CONCRETE ROLLER SCREED

CROSS-REFERENCE TO RELATED APPLICATIONS

This application claims the benefit of U.S. Provisional Application No. 62/778,793, filed Dec. 12, 2018, the entirety of which is hereby incorporated by reference.

FIELD OF THE DISCLOSURE

The present disclosure generally relates to a power head for a powered concrete roller screed.

BACKGROUND OF THE DISCLOSURE

A type of concrete finishing tool is a powered roller screed. The powered roller screed generally includes a screed roller (e.g., an elongated tube) having one end rotationally driven by a power head. An opposite end of the screed roller is rotatably connected to a non-powered head acting as a bearing for the screed roller. In operation, the screed roller is positioned over the poured concrete with the ends of the screed roller positioned on the upper edges of the concrete forms. The screed roller is then moved along the upper edges of the forms in a direction that is opposite to the rotation of the screed roller. Usually one worker pulls the power head, and another worker pulls the non-powered head. One type of a conventional power head includes a corded driver having an electric motor that is powered by a remote power source (e.g., from an electrical outlet) via an electrical cord. Other types of power heads may be powered by a gas motor or a hydraulic motor.

SUMMARY OF THE DISCLOSURE

In one aspect, a power head for a powered concrete roller screed comprises a handle and a driver housing at a distal end of the handle. A cordless, battery-operated driver is received in the driver housing. The cordless, battery-operated driver includes a longitudinal axis, a trigger configured to be depressible in a direction generally transverse to the longitudinal axis, and an output shaft having a rotational axis extending generally perpendicular from the longitudinal axis. A head actuator includes a translatable link extending along the handle and an eccentric cam. The eccentric cam is operatively connected to the translatable link within the drive housing such that translation of the translation link imparts rotation of the eccentric cam about a rotational axis of the eccentric cam to an actuated position. The eccentric cam is adjacent the trigger of the cordless, battery-operated driver and is configured to depress the trigger when the eccentric cam is rotated about its rotational axis to the actuated position.

In another aspect, a power head for a powered concrete roller screed comprises a handle, a driver housing at a distal end of the handle, and a head actuator. The head actuator includes a translatable link extending along the handle and an eccentric cam. The eccentric cam is operatively connected to the translatable link within the drive housing such that translation of the translation link imparts rotation of the eccentric cam about a rotational axis of the eccentric cam to an actuated position. The eccentric cam is configured to depress a trigger of a driver received in the driver housing when the eccentric cam is rotated about its rotational axis to the actuated position.

In another aspect, a power head for a powered concrete roller screed comprises a handle and a driver housing at a distal end of the handle. A cordless, battery-operated driver is received in the driver housing. The cordless, battery-operated driver includes a longitudinal axis, a trigger configured to be depressible in a direction generally transverse to the longitudinal axis, and an output shaft having a rotational axis extending generally perpendicular from the longitudinal axis. A head actuator is operatively connected to the handle and the driver. The head actuator includes an eccentric cam configured to rotate about an axis of rotation to selectively depress the trigger of the cordless, battery-operated driver to operate the cordless, battery-operated driver.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
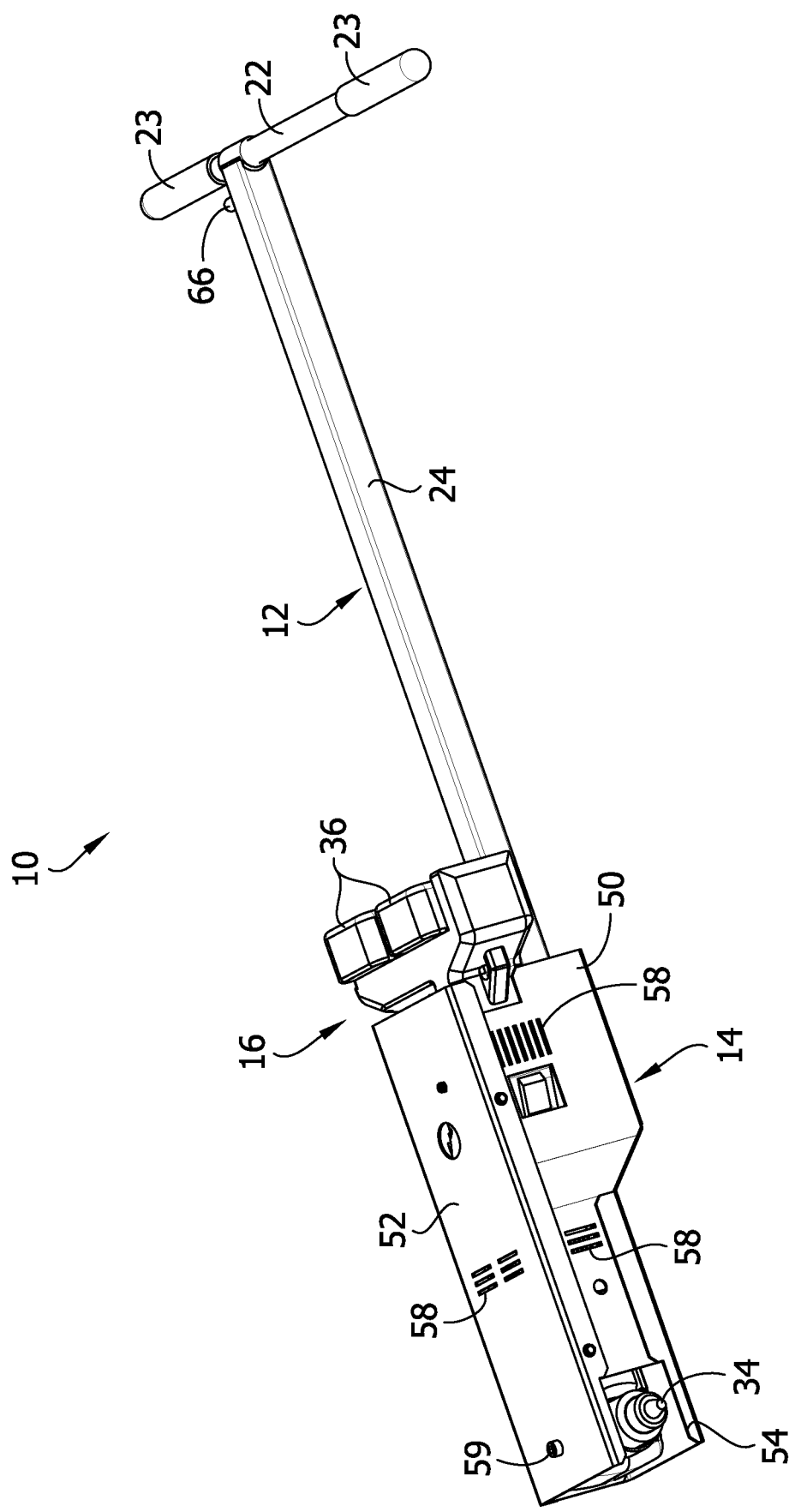
FIG. 1 is a perspective of an illustrated power head for a concrete roller screed.

Referring to FIG. 1, one embodiment of a power head for a concrete roller screed is generally indicated at reference numeral 10. As shown in FIG. 1, the power head generally includes a handle, generally indicated at reference numeral 12; a driver housing, generally indicated at reference numeral 14, at a distal end of the handle; and a cordless (e.g., battery-operated) driver, generally indicated at reference numeral 16, received in the driver housing. As shown best in FIG. 6, the power head 16 also generally includes a head actuator, generally indicated at reference numeral 18, extending along (e.g., within) the handle 12 to the driver housing 14 (see FIG. 4). In general, the power head 10 is operable to power rotation of a screed roller (not shown) without a remote power source, whereby the power head is "cordless." Moreover, as explained in more detail below, the head actuator 18 is configured as a translation-to-rotation mechanism to actuate the driver 14 within the driver housing 14.

Figure 3:
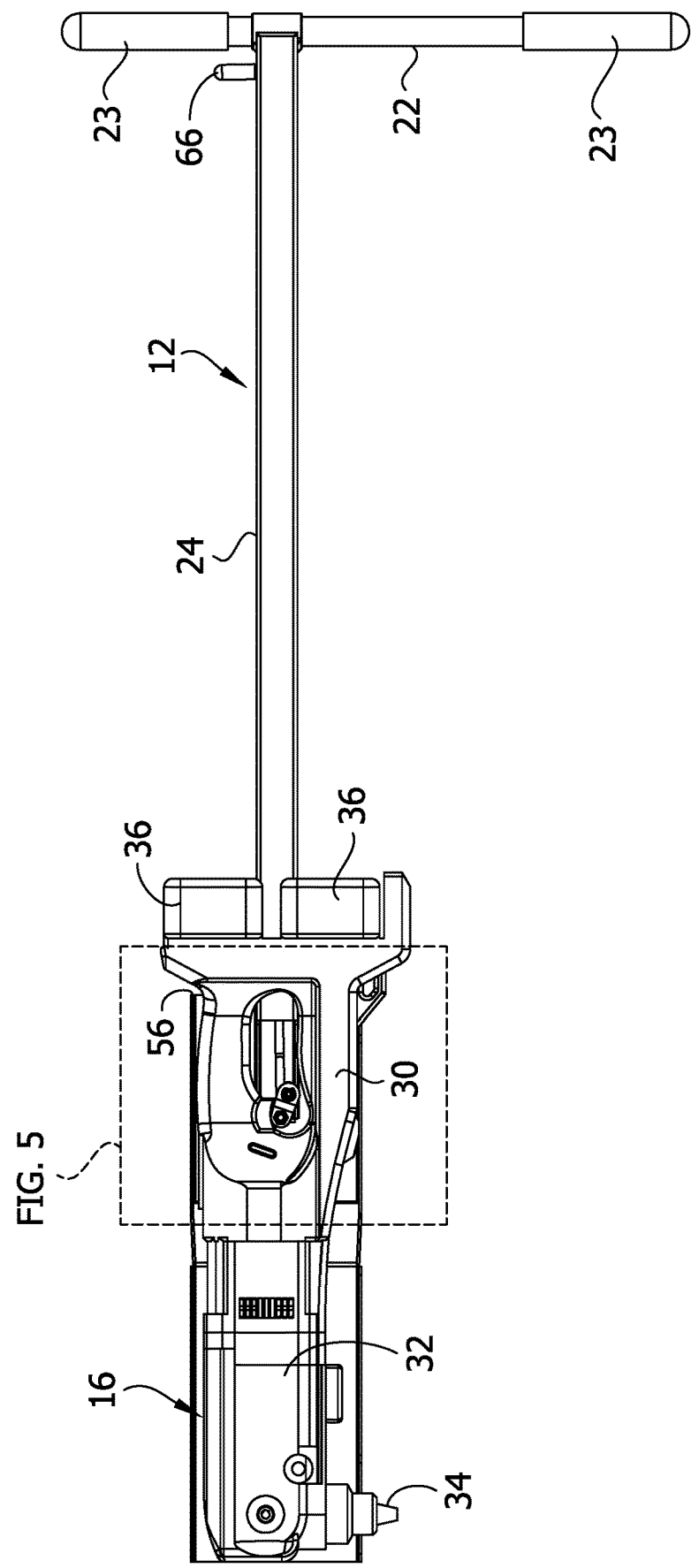
FIG. 3 is an elevational view of the power head with a cover of a driver housing removed to show internal components.
Figure 4:
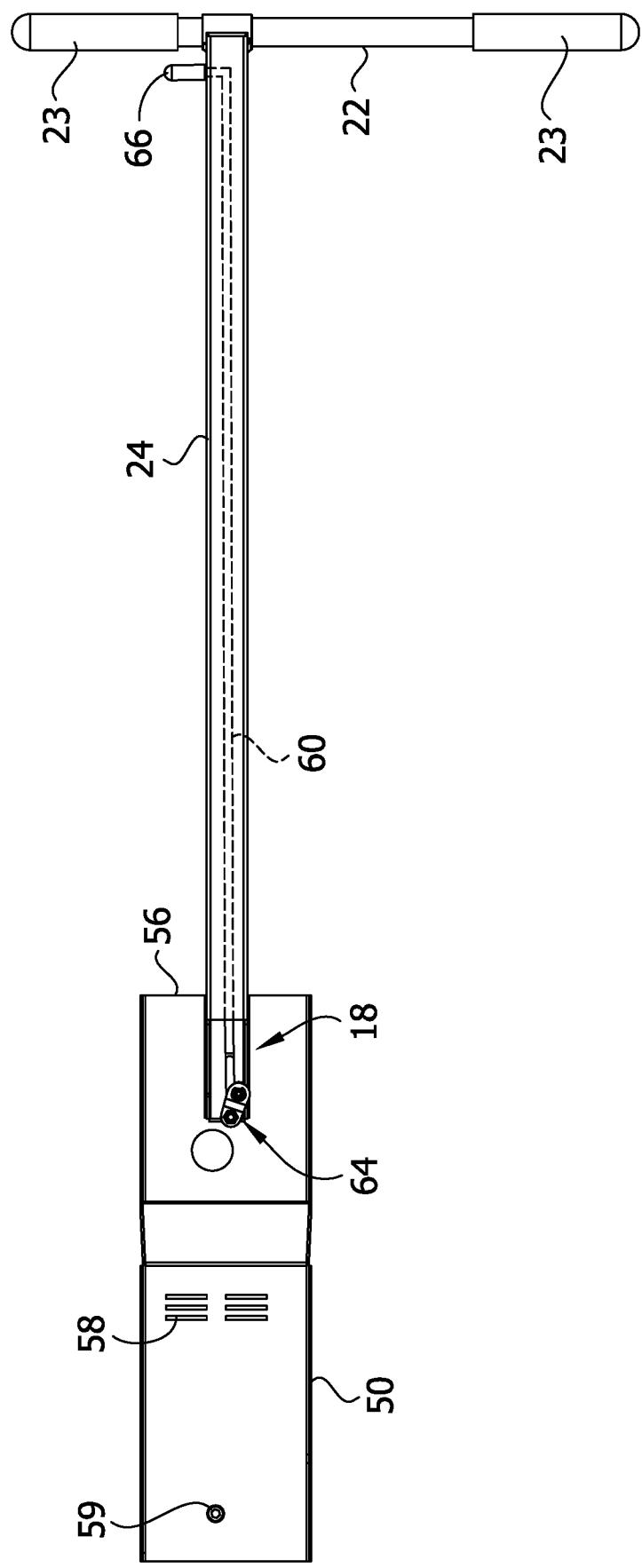
FIG. 4 is similar to FIG. 3 with the driver removed.
Figure 7:
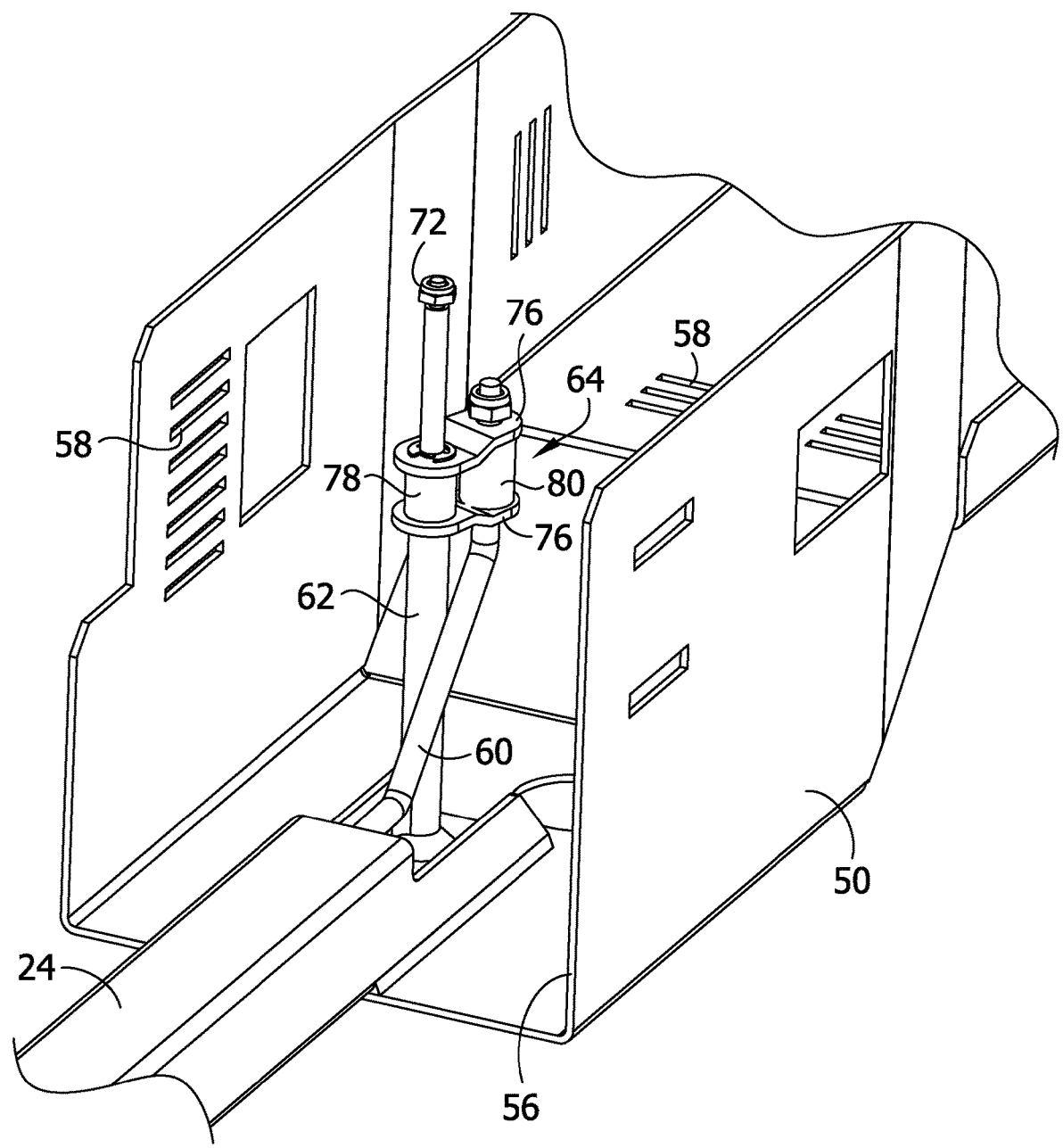
FIG. 7 is an enlarged, perspective of a distal end of the actuator within the driver housing.

Referring to FIGS. 1, 3, and 4, the handle 12 of the power head 10 generally includes a hand grip 22, and a shaft 24 extending generally transverse from the hand grip to the driver housing 14. The hand grip 22 may include a bar (e.g., a round cross-sectional bar). Hand cushions 23 for gripping by the user may be provided on the bar 22. The hand grip 22 is attached the shaft 24 at a proximal end of the shaft. The distal end of the shaft 24 is attached (e.g., welded) to the proximal end of the driver housing 14, as shown in FIG. 7. The illustrated shaft 24 is hollow so that a portion of the head actuator 18 is received therein, as shown in FIG. 4. The shaft 24 may have a rectangular cross-section or other cross-sectional shapes. The hand grip 22 and the shaft 24 may be generally rigid. As an example, one or both of the hand grip 22 and the shaft 24 may be formed from metal, such as but not limited to steel or aluminum.

Figure 2:
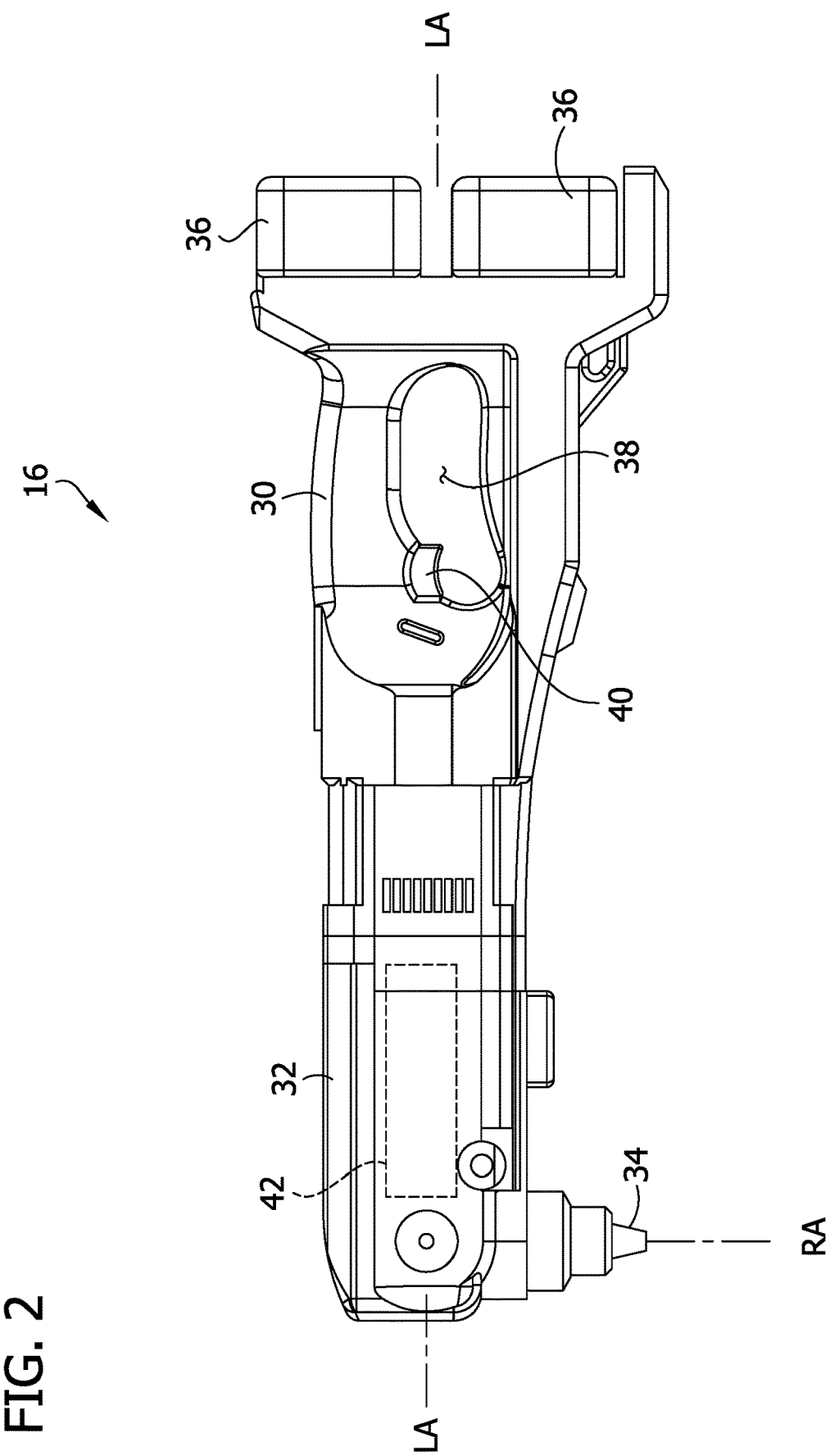
FIG. 2 is an elevational view of a cordless (e.g., battery-operated) driver of the power head including an output shaft extending transversely relative to a longitudinal axis of a handle and housing of the driver.

Referring to FIG. 2, the driver 16 has a longitudinal axis LA extending through proximal and distal ends of the driver. The driver 16 generally includes a driver handle 30 at the proximal end of the driver, a motor housing 32 adjacent the distal end of the driver, an output shaft 34 at the distal end of the driver, and a rechargeable, portable power source 36 (e.g., one or more rechargeable batteries) at the proximal end of the driver. The portable power source 36 is selectively removable from the driver 16 to allow recharging. The driver handle 30 and the motor housing 32 are generally axially aligned along the longitudinal axis LA. The power source 36 is also generally axially aligned along the longitudinal axis LA. The driver handle 30 and the motor housing 32 may comprise plastic or other material. The output shaft 34 is rotatable about a rotational axis RA that extends generally perpendicular to the longitudinal axis LA.

Referring still to FIG. 2, the illustrated driver handle 30 defines a handle opening 38 having a perimeter defining a closed shape (e.g., generally oval or racetrack shape). A driver trigger 40 is received in the opening 38 and extend inward from the opening perimeter. The driver trigger 40 is resiliently depressible relative to the driver handle 30 in a direction that is generally transverse (e.g., perpendicular) to the longitudinal axis LA of the driver 16. Depressing or actuating the driver trigger 40 delivers electric power from the portable power source 36 to an electric motor 42 in the motor housing 32, which in turn imparts rotation to the output shaft 34, as can be generally understood by one having ordinary skill in the art. The output shaft 34 is operably couplable to the screed roller (not shown), such as by an adaptor. In general, the illustrated driver 16 is configured as a portable right angle drill, although the driver may be of other configurations. It is understood that in one or more other embodiments, the driver handle 30 may not define a handle opening in which the driver trigger 40 is received. Instead, for example, the driver trigger may be accessible on an exterior of the driver handle.

Referring to FIGS. 1 and 3, the driver housing 14 is sized and shaped to receive the driver 16 therein. The driver housing 14 includes a housing body 50 and a cover 52 removably attached to the housing body. The housing body 50 and the cover 52 may be formed from metal or other material. A sidewall of the driver housing 14 defines an output shaft opening 54, adjacent a distal end thereof, through which the output shaft 34 of the driver 14 extends. The driver housing 14 defines a power source opening 56 at the distal end of the housing through which the distal end of the driver 16 extends so that the portable power source 36 is accessible to a user to allow selective removal and recharging of the power source. The driver housing 14 defines openings 58 to allow removal of heat generated by the driver 16. One or more set screws 59 (e.g., two set screws; FIGS. 1 and 4) are threaded through one or both of the housing body 50 and the cover 52 adjacent the distal end of the driver 16 to hold and/or adjust a position of the output shaft 34 relative to the output shaft opening 54 and the housing 14 in general so that the position or orientation of the output shaft 34 is preferably alignable with the axis of the screed roller.

Figure 6:
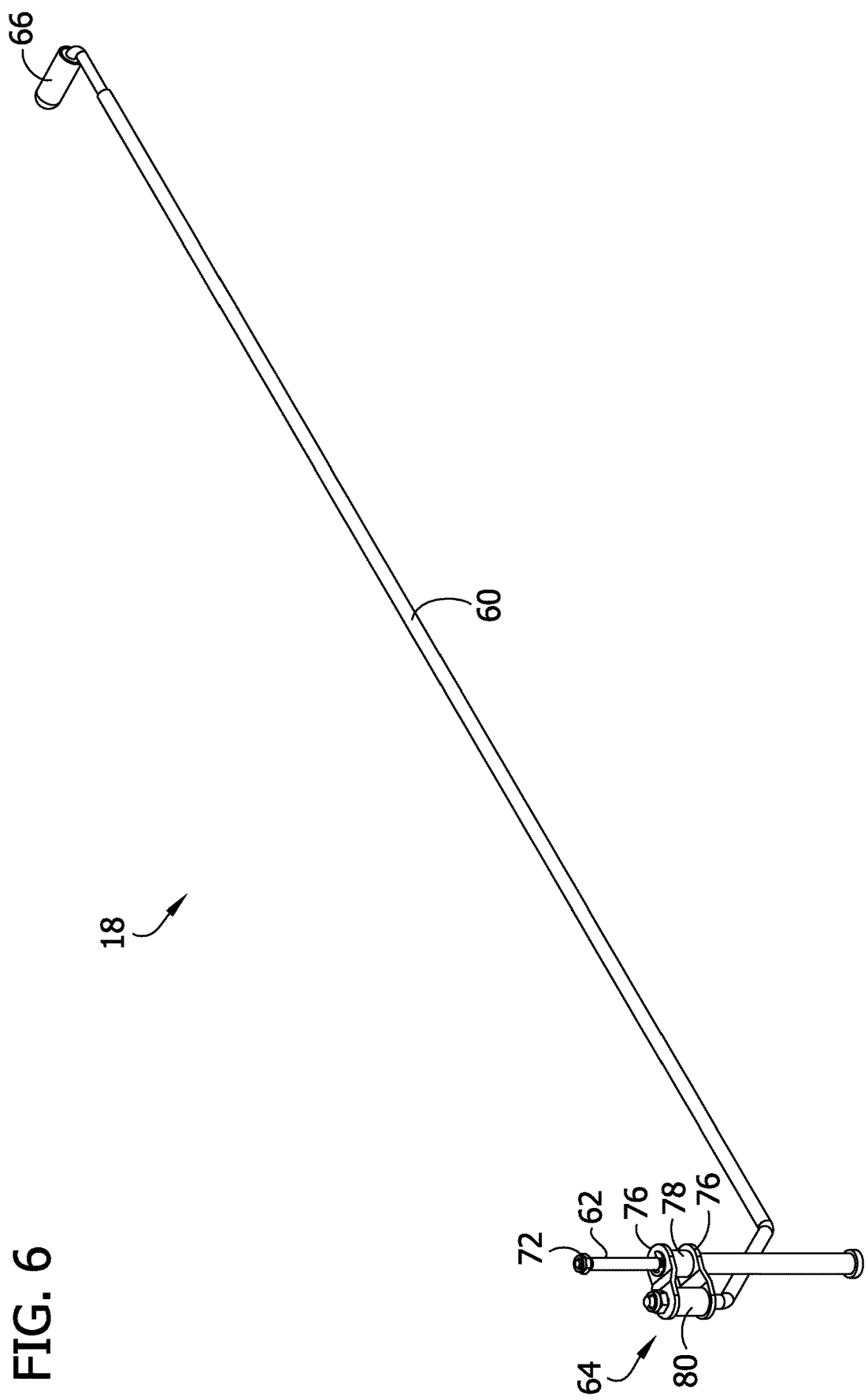
FIG. 6 is a perspective of an actuator of the power head.
Figure 8:
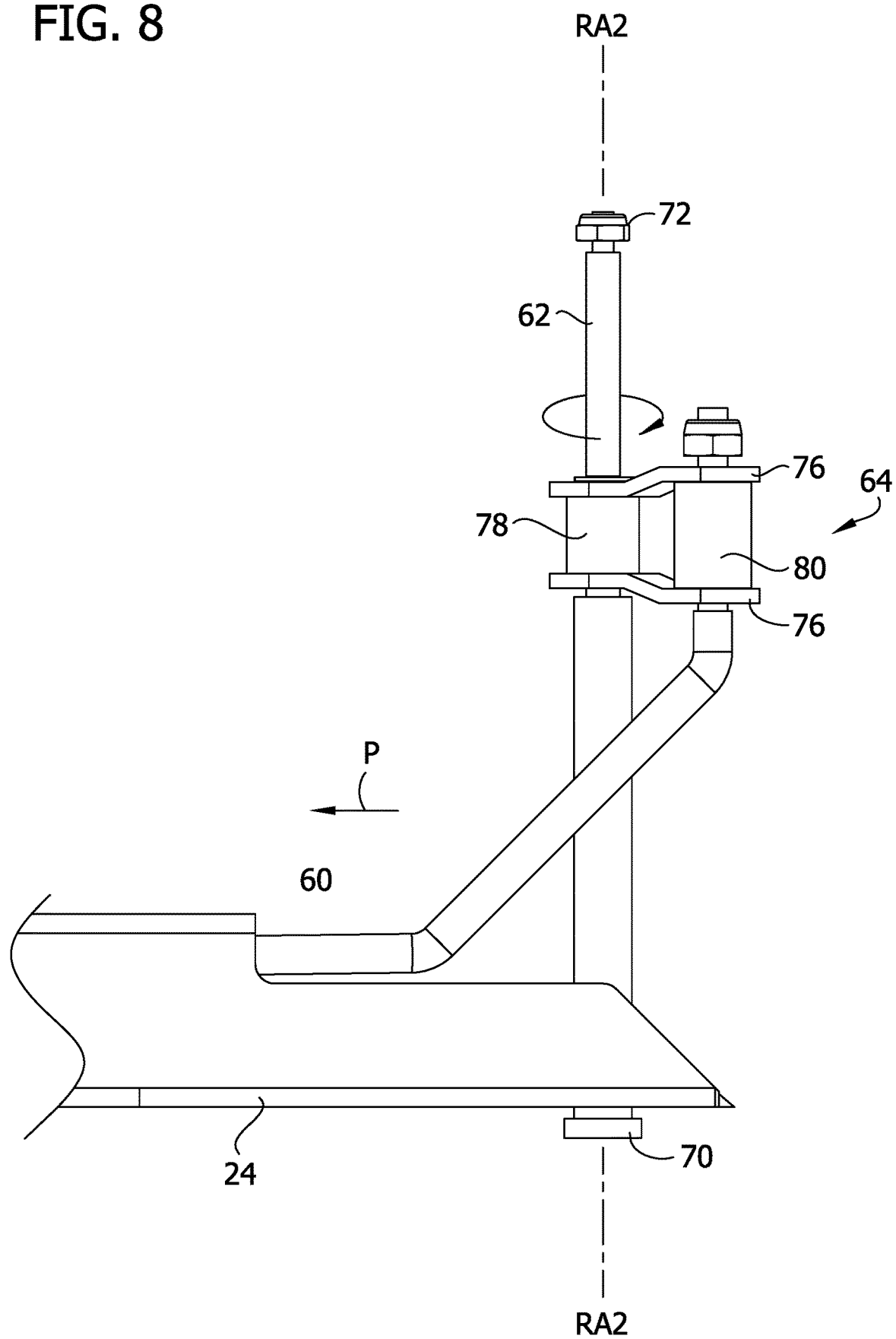
FIG. 8 is an enlarged elevational view of the distal end of the actuator.

Referring to FIGS. 4 and 6-8, the head actuator 18 generally includes an elongate, translatable link 60 (e.g., a rod or shaft) extending along and within the handle shaft 24; a rod or spindle 62 within the driver housing 14; and a rotatable eccentric cam, generally indicated at 64, operatively coupled to a distal end of the link 60. The link 60 is generally rigid and, in the illustrated embodiment, is a one-piece component. The link 60 has a proximal end extending generally transverse to a longitudinal axis of the link and defining a trigger 66. The trigger 66 extends through the handle shaft 24. The trigger 66 is accessible by a user's finger(s) to squeeze the trigger and move the link 60 proximally. As shown in FIGS. 6-8, the distal end of the link 60 extends upward (e.g., bent upward) and is coupled to the eccentric cam 64 at a location off-center from the rotational axis RA2 of the cam, as explained in more detail below. The spindle 62 is attached to the driver housing 14 so that the spindle 62 extends generally transverse to the longitudinal axis of the link 60. In the illustrated embodiment, opposite ends of the spindle 62 extends through opposing walls (e.g., the cover 52 and opposing wall of the body 50) of the driver housing 14. One end of the spindle 62 includes a shoulder or stop 70 engaging the exterior of the housing 14, and a threaded opposite end on which a nut 72 is threaded to engage the exterior of the housing. The illustrated spindle 62 is fixedly coupled to the housing 14 so that it does not rotate about its axis, although the eccentric cam rotates. It is understood that the spindle may be rotatable relative to the housing 14 and fixed to the eccentric cam.

The illustrated eccentric cam 64 includes spaced apart, opposing arms 76 (e.g., upper and lower plates). A spindle bushing or bearing 78 and a link bushing or bearing 80 are received between (and space apart) the opposing arms 76. The link bushing 80 engages the driver trigger 40 and is configured to rotate as the link bushing depresses the driver trigger. The spindle 78 extends through the opposing arms 76 and the spindle bearing 78 at a center of the eccentric cam 64. The spindle defines a shoulder on which the cam 64 rests. The eccentric cam 64 is rotatable about the spindle 78 so that the spindle defines the rotational axis RA2 of the eccentric cam. The distal end of the link 60 extends through the opposing arms 76 and the link bearing 80 at an eccentric location spaced radially from the rotational axis RA2 of the eccentric cam 64. The eccentric cam 64 is rotatable about distal end of the link 60. As can be understood from the description, translation of the link 60 in the proximal direction, as indicated by reference P, imparts rotation of the eccentric cam 64 about the rotational axis RA2. In general, the actuator 18 is generally configured as a translation-to-rotation mechanism. It is understood that the actuator may be other translation-to-rotation mechanisms. Moreover, the actuator may take on other configurations suitable for actuating the driver 16, as explained below.

Figure 5:
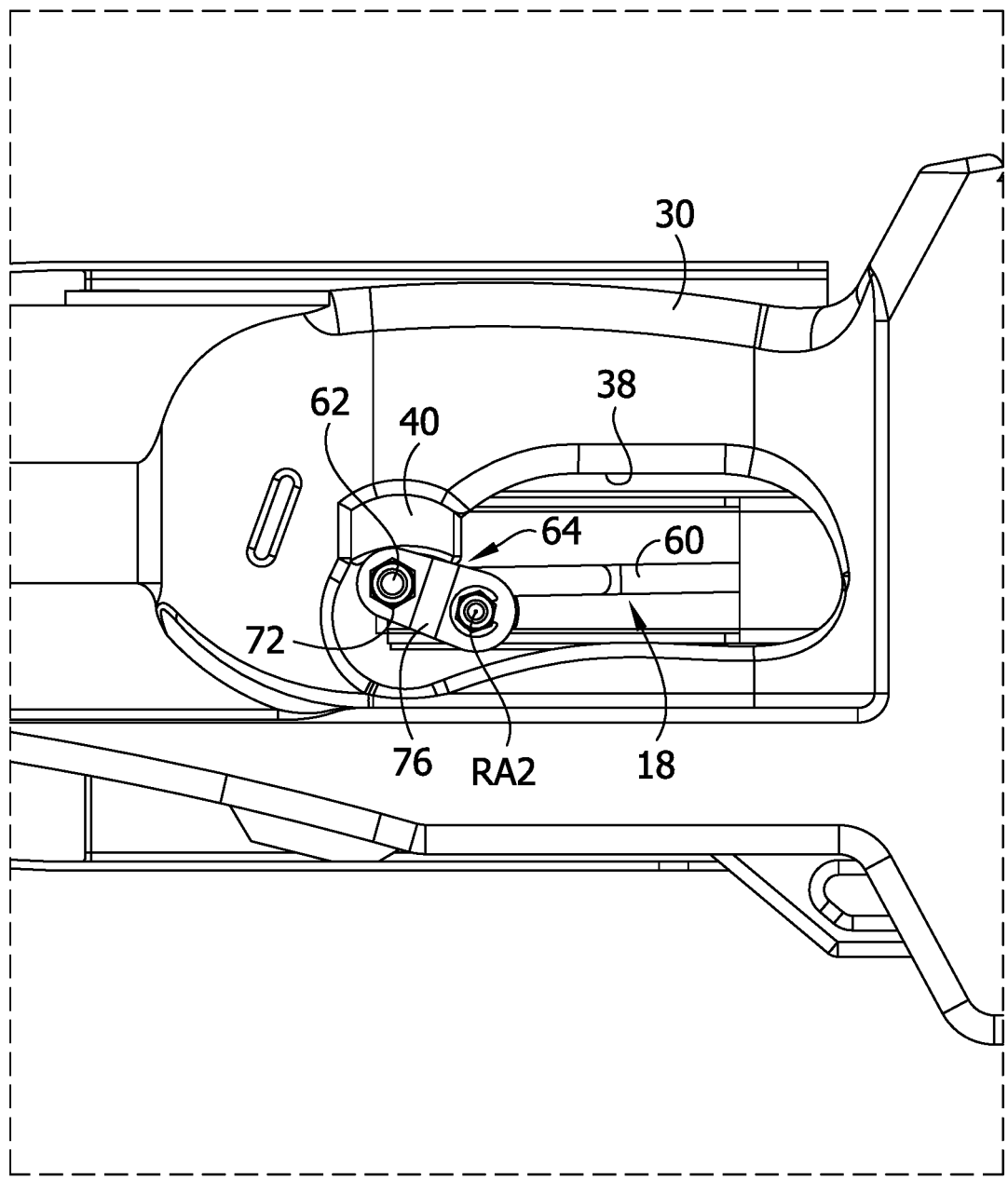
FIG. 5 is an enlarged view of FIG. 3 as indicated by detail FIG. 5 in FIG. 3.

Referring to FIG. 5, the eccentric cam 64 is configured to be adjacent the driver trigger 40 within the driver housing 14. In the illustrated embodiment, the eccentric cam 64 is received in the handle opening 38 of the illustrated driver 16, although in other embodiments the driver may not define a handle opening. In a non-actuated position of the head actuator 18, such as shown throughout the drawings, the driver trigger 40 is in a released or non-actuated position. When the actuator trigger 66 is squeezed by the user, the link 60 translates proximally. Proximal translation of the link 60 imparts rotation of the eccentric cam 64 about the rotational axis R2. As the eccentric cam 64 rotates, the cam (e.g., the arms 76 and/or the link bearing 80) engages the driver trigger 40 and moves the trigger generally transverse to the longitudinal axis LA of the driver 16 to its depressed or actuated position, whereby the driver is actuated and the output shaft 34 rotates about its rotational axis R1. When the actuator moves 18 move back to the non-actuated position, the driver trigger 40 is released to turn off the driver. The head actuator 18 may be biased to the non-actuated position, such as by a spring or other mechanism. In the non-actuated position, the head actuator 18, specifically the eccentric cam 64, does not depress the driver trigger 40.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A power head for a powered concrete roller screed comprising:
    a handle;
    a driver housing at a distal end of the handle;
    a head actuator including a translatable link extending along the handle, and an eccentric cam operatively connected to the translatable link within the drive housing such that translation of the translation link imparts rotation of the eccentric cam about a rotational axis of the eccentric cam to an actuated position, wherein the eccentric cam is configured to depress a trigger of a driver received in the driver housing when the eccentric cam is rotated about its rotational axis to the actuated position,
    wherein the translatable link extends through the handle and into the driver housing to connect to the eccentric cam.

2. The power head of claim 1, wherein the eccentric cam is biased in an unactuated position, wherein in the unactuated position the eccentric cam is configured to not depress the trigger of the driver.

3. The power head of claim 1, wherein the translatable link is operatively connected to the eccentric cam at a position spaced apart from the rotational axis.

4. The power head of claim 1, wherein the eccentric cam rotates toward the handle when the eccentric cam is rotated about the rotational axis to the actuated position.

5. The power head of claim 1, wherein the eccentric cam is entirely disposed within the driver housing.

6. A power head for a powered concrete roller screed comprising:
    a handle;
    a driver housing at a distal end of the handle;
    a cordless, battery-operated driver received in the driver housing, the cordless, battery-operated driver including a longitudinal axis, a trigger configured to be depressible in a direction generally transverse to the longitudinal axis, and an output shaft having a rotational axis extending generally perpendicular from the longitudinal axis; and
    a head actuator operatively connected to the handle and the driver, the head actuator including an eccentric cam disposed within the driver housing and configured to rotate about an axis of rotation to selectively depress the trigger of the cordless, battery-operated driver to operate the cordless, battery-operated driver
    wherein the cordless, battery-operated driver includes a handle opening having a closed perimeter, the trigger disposed in the handle opening, the eccentric cam configured to rotate within the handle opening to selectively depress the trigger of the cordless, battery-operated driver.

7. The power head of claim 6, wherein the handle includes an actuator trigger operatively connected eccentric cam such that movement of the actuator trigger rotates the eccentric cam about the axis of rotation.

8. The power head of claim 6, wherein the axis of rotation extends through the handle opening.

9. The power head of claim 6, wherein the head actuator includes a spindle attached to the driver housing and defining the rotational axis, the eccentric cam mounted on the spindle.

10. The power head of claim 9, wherein the eccentric cam includes a spindle bushing rotatably mounting the eccentric cam on the spindle.

11. The power head of claim 10, wherein the eccentric cam includes a link bushing configured to engage the trigger of the cordless, battery-operated driver to depress the trigger, the link bushing configured to rotate as the link bushing depresses the trigger.

12. A power head for a powered concrete roller screed comprising:
    a handle;
    a driver housing at a distal end of the handle;
    a head actuator including a translatable link extending along the handle, and an eccentric cam operatively connected to the translatable link within the drive housing such that translation of the translation link imparts rotation of the eccentric cam about a rotational axis of the eccentric cam to an actuated position, wherein the eccentric cam is configured to depress a trigger of a driver received in the driver housing when the eccentric cam is rotated about its rotational axis to the actuated position,
    wherein the eccentric cam rotates toward the handle when the eccentric cam is rotated about the rotational axis to the actuated position.

13. The power head of claim 12, wherein the handle includes an actuator trigger operatively connected eccentric cam such that movement of the actuator trigger rotates the eccentric cam about the axis of rotation.

14. The power head of claim 12, wherein the head actuator includes a spindle attached to the driver housing and defining the rotational axis, the eccentric cam mounted on the spindle.

15. The power head of claim 14, wherein the eccentric cam includes a spindle bushing rotatably mounting the eccentric cam on the spindle.

16. The power head of claim 15, wherein the eccentric cam includes a link bushing configured to engage the trigger of the cordless, battery-operated driver to depress the trigger, the link bushing configured to rotate as the link bushing depresses the trigger.

\* \* \* \* \*